INVENTORS
Rudolf Stark &
Hans-Joachim Held
BY Spencer & Kaye
ATTORNEYS

INVENTORS
Rudolf Stark &
Hans-Joachim Held
BY Spencer & Kaye
ATTORNEYS

INVENTORS
Rudolf Stark &
Hans-Joachim Held
BY Spencer & Kaye
ATTORNEYS

United States Patent Office 3,381,273

Patented Apr. 30, 1968

3,381,273

TRANSMISSION SYSTEM

Rudolf Stark, Constance, and Hans-Joachim Held, Litzelstetten, Germany, assignors to Telefunken Patentverwertungs-G.m.b.H., Ulm (Danube), Germany Filed May 21, 1964, Ser. No. 369,194
Claims priority application Germany, May 22, 1963, T 24,041
8 Claims. (Cl. 340—146.1)

ABSTRACT OF THE DISCLOSURE

A digital data transmission system for transmitting a continuous stream of bits, composed of data bits, filler bits and check bits, at a rate higher than the maximum rate at which information bits are delivered to the transmission system, the transmission rate of the system being synchronized by a clock, the data bits and filler bits being delivered to an output converter of the transmitter in blocks of predetermined length, each block having a succession of check bits added to it, and the filler bits and data bits being fed to a coding device which codes the bits for producing error indications.

The present invention relates generally to the transmission art, and, more particularly, to a system for transmitting digital data along a transmission path and which includes protection against errors.

For example, transmission along Teletype lines is a type of transmission in which error checking might be desired. Recently, there has often been a desire to use teletypewriters for the transmission of data which is subjected to automatic processing at a distant site, for example, in an electronic computer, or which is fed to a distant site after automatic processing. Such a need exists, for example, in flight safety systems where the requirements as to reliability of transmission are particularly high.

It has been known and is customary in Teletype systems to code the symbols to be transmitted into a plurality of binary bits (or "steps" in the case of Teletype). These bits are serially transmitted. In order to protect against errors which may result from an alteration in bits which are serially transmitted due to "pulse noise," it is known to carry out a so-called longitudinal test which, when it is extensive, e.g. when it involves the use of a code of the type developed by Fire, divides bit sequences into a certain length, which can be referred to as blocks, and adds a number of check bits to each of these blocks. The check bits are produced at the transmission side in an encoder which may take the form of a specially arranged shift register. This register which is connected in parallel with the communication path, receives the information bits in block form and forms the check bits which are to be added to these blocks and which, in the final analysis, represent the result of a larger number of parity checks. At the receiver side, a decoder is provided having a shift register arranged in the same manner and producing check bits and having comparison means. This method permits the automatic correction of group errors extending up to a certain length of bit succession and also permits the discovery of group errors having a larger average length, with a very high degree of probability but without the possibility of automatic correction by the device. Thus, errors of a certain size can be automatically corrected whereas those of a larger average size can be detected.

It is known that in order to correct errors which are discovered at the receiver, but which cannot be there corrected, a signal will be sent to the transmitter to request that the signal be repeated. With full two-way or duplex operation using two lines, the error messages can be transmitted by means of the return line.

For the type of data transmission under consideration, it is necessary to synchronize the transmitter and receiver with each other. In Teletype connections, synchronization customarily takes place by means of start and stop steps or bits. However, even these can be distorted because of disturbances.

With this prior art in mind, it is a main object of the present invention to provide for the transmission of digitally coded data through transmission paths such as Teletype lines in which interferences occur, and wherein there is a high degree of protection against errors.

Another object is to provide a device of the character described including means for error correcting and error detecting, and providing high reliability in the synchronization of transmitted and received bits and blocks.

These objects and others ancillary thereto are accomplished in accordance with preferred embodiments of the invention wherein a continuous stream of successive bits is produced in the transmission path and synchronization is made possible by inserting information and check bits, when they occur, in the place of the bits of the filler signals of the continuous stream. The input speed of the information is lower than the transmission speed so that, after transmission of a certain number of information and/or filler signals, the number of check bits which is necessary for protection against errors can be inserted. Also, the speed relationship is chosen so that filler signals will necessarily occur at intervals of a desired minimum length. This feature is of particular interest when transmission is to be protected to the same extent in both directions. In such case, provision is made to use a different line for transmitting in each direction, to transmit the continuous bit stream, and to utilize the blocks having filler signals for re-transmitting messages regarding errors, this being accomplished by inserting error informing signals in place of the filler signals.

In one preferred embodiment of the system of the present invention, a control network is provided at the transmitter which effects the availability of filler signals and controls the synchronized bit output. Also, an input converter for information which eliminates, when desired, start and stop steps is connected to the control network. A buffer storage means delivering information bits with greater speed is connected after the input converter, and an output converter is connected to the buffer storage means and to an encoder to produce check bits. The bits are fed section by section in an alternating manner to two buffer storage means which cooperate with decoding networks at the receiver. One of these respective buffer storage means receives the bits while the other transmits its information at decreased speed to an output converter.

As another feature of the invention, the receiver buffer storage means is arranged to perform an output operation under the control of a decoding device before it delivers its data to an output. At increased speed, the data appearing at the output is re-transmitted into the input of the storage means and the error checking process takes place during this operation. This provides that the delivery of data to the output is only initiated if it is determined that no errors are present or if a correctible error was found and corrected. On the other hand, when an uncorrectible error is found, an error signal is delivered instead. In this manner, information concerning errors does not even reach the final receiving device proper.

Additional objects and advantages of the present invention will become apparent upon consideration of the following description when taken in conjunction with the accompanying drawings in which.

Figure 1:
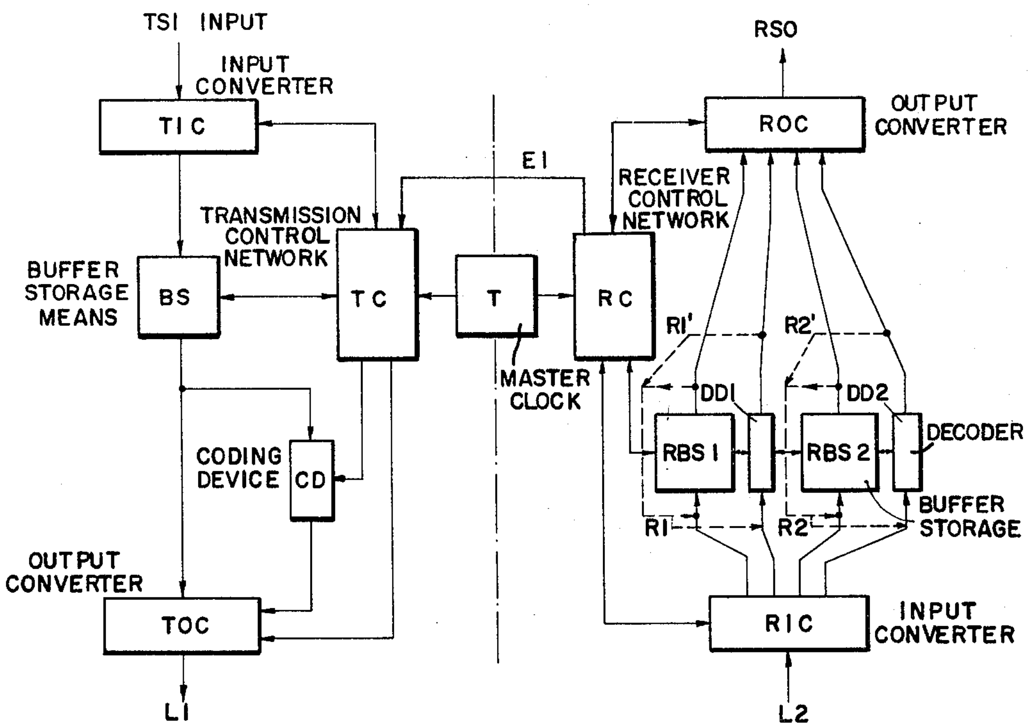
FIGURE 1 is a schematic block diagram of the system of the present invention.

With more particular reference to the drawings, the transmission side of the system is illustrated to the left of the dot-dash line in FIGURE 1, while the receiver side is shown on the right side of this line. When a full duplex operation is to be carried out, with two lines as is assumed here, each station contains both a transmission side and a receiving side of the type shown. The information which is accumulated comes, for example, from an electronic computer, and this information is to be transmitted to a distant evaluation site along a Teletype line or is to be fed to a distant computer from this location. This data is fed to the input TSI of the transmission side in the form of Teletype signals in the code which is customary for this type of signal. The input speed may be assumed to be 75 baud.

A cyclic frequency or synchronization signal corresponding to a step or bit sequence frequency of 100 baud is imposed upon a transmission control network TC by a master clock T which will be described in more detail below. This transmission control network TC is operatively connected with a transmitter input converter TIC, a buffer storage means BS, a coding device CD, and a transmitter output converter TOC, all as indicated by arrows in the drawings. The control network TC effects a feeding of the Teletype information from the input converter TIC into the buffer storage means BS and also provides that, during this operation, all of the start and stop steps are suppressed. Thus, for each symbol, only the pure information bits, constituted by five bits per symbol for example, are transmitted to the buffer storage means BS. The control network furthermore causes a transmission of the information bits out of the buffer storage means BS at a rate of 100 baud.

As a further explanation of the mode of operation, it is assumed that a Teletype communication has just finished and at the end of the communication a bell signal was fed in at TSI. The control network TC then produces continuous bell signals at a rate of 100 baud and transmits these to the output converter TOC from which they are fed to the line L1. In parallel with this, the bell signals are fed into the coding device CD. This coding device operates, for example, according to a Fire code. The principle and mode of operation of these codes are known and are taught, for example, in the article "Binary Controls for Error Control," by W. W. Peterson, in "Communication and Electronics" of January 1962, pp. 648 et seq. The bits are separated into blocks of a predetermined length and check bits, which are determined in the coding device, are added to each block of bits. A block is assumed to have a fixed number of 10 symbols, or 50 bits in a five-bit code, and twelve check bits follow after one filler step.

Thus, it is possible, for example, to automatically correct a group error extending over a length of up to five steps. Besides, group errors of a length of six to twelve steps are discovered with a probability of about 98%. However, these latter errors cannot be automatically corrected. In addition, there remains a group of errors which are not capable of being discovered and this group includes, to a degree which increases with the length of the error, group errors of a length of 13 through 63 steps. The prerequisite of all this is that only one occurrence of an error takes place within one block, that is, a single error or a group error. The length of a group error is determined by the distance between the first and the last faulty bit of the error occurrence independently of whether the bits disposed in between have errors or not.

The sending of the bits into the transmission path is always carried out so that first the bits of the block are fed to the transmission path and to the coding device, and after this the output of the coding device is connected, by a gating action, to the transmission path and feeds the check bits into this path. This process takes place continuously also in the case of the feeding of bell signals described above.

If new information in the form of Teletype signals arrives at input TSI then, as mentioned above, the control network TC is arranged to cause the pure information bits to be transmitted to the buffer storage means BS and also to cause these information bits to be delivered from the storage means at a speed of 100 baud. They are further transmitted to the output converter TOC in place of the bell signals, and they are also delivered to the coding device CD where they are treated for purposes of error coding in the same manner described above. Because there is an omission of the start and stop steps, and particularly because of the change in transmission speed from 75 to 100 baud, the transition to the higher transmission speed takes place and the time which is thereby gained permits the feeding of check bits which have been determined by the coding device, the feeding taking place after the ten symbols of each block. At a feeding speed of 75 baud, the synchronizing or cycle determining device requires one second to transmit ten symbols into the input converter TIC. However, at the higher transmission speed of 100 baud, one block is transmitted in 630 milliseconds, this block consisting of ten five-bit combinations, one filler step, and twelve check bits, so that an uninterrupted feeding is possible without exceeding channel capacity due to the additionally inserted check bits. Rather, there is even enough time to additionally insert up to five Teletype signals per block into the data stream.

The input of new Teletype information may take place at any time. In the most disadvantageous case, transmission of the tenth bell signal of a block has just been started when the new information arrives at the input. Then, in addition to the fifty-first step of the block (filler step), the twelve check steps of the respective block must be fed into the line before the first information signal can be put into output converter TOC. It is for this reason that the buffer storage means BS is provided and in the present case it is sufficient if it has a capacity of four Teletype symbols. Besides, the replacement of the bell signals by information signals can be started at the moment of occurrence of any symbol of the block of bits running through the device, and the control network TC, in this sense, controls the output from the buffer storage means BS.

As soon as a further gap arises at input TSI, because of the lower input speed, and if this gap is not filled by check bits, the control network TC delivers further filler signals to the output converter TOC and to the coding device CD, the further signals preferably indicating letters or figures depending upon whether letters or figures were previously transmitted, and this again occurs in continuous sequence. These letter or figure signals take the place of information signals in the blocks as long as the information signals are not available, so that a continuous transmission of bits is provided either in the form of information bits, in the form of check bits, or in the form of the above-mentioned filler bits.

Thus, the result is that there is a continuous stream of bits delivered to the line L1. An alternate succession of block bits and check bits is formed and the block bits are constituted by filler signals at whose locations information bits are inserted instead when such information bits are available. The continuous stream of bits is further utilized for synchronizing the transmitter and receiver, as will be described in detail below.

On the receiver side of the device, the continuous stream of bits is received by an input converter RIC. This converter is controlled by a receiver control network RC and the receiver side also includes a first buffer storage means RBS1 having a decoding device DD1, a second buffer storage means RBS2 having a decoding device DD2, and an output converter ROC which delivers the data which it receives to the receiver or Teletype output RSO.

Under the control of the control network RC, which also receives the 100 baud cycle or synchronous timing signal from T, the information bits are fed from input converter RIC alternately into the buffer storage means RBS1 and the buffer storage means RBS2 and are subjected to an error examination and/or correction by the respective decoding device DD1 or DD2 pertaining thereto. During the time that a block having check bits is read into one buffer storage means at a rate of 100 baud, the other buffer storage means can deliver its data at 75 baud to the output converter ROC. This delivery to the output converter is accomplished together with a suitable correction of the correctible errors by the decoding device associated with the particular buffer storage means, or together with the delivery of an error signal by the decoding device. The principles of the function and construction of a decoding device to be used with the encoding device CD is also described in the above-mentioned article in "Communication and Electronics" by W. W. Peterson.

In order to prevent faulty communication signals from arriving at the Teletype output RSO via the converter ROC, additional arrangements are provided as follows. The error correction takes place by having a block with its check bits read into a buffer storage means at 100 baud and by then making a certain period of time available to the buffer storage means before it has to transmit to converter ROC, this period in the example being 10 milliseconds. During this latter period of time the contents of the buffer storage means are read out at an increased speed, upon initiation by the control network RC, and the storage means is subjected to an error examination by its associated decoding device. The bits which are read out are not delivered to converter ROC, but rather are fed back to the input of the buffer storage means as indicated by the dashed line R1 and R2. If, during this operation a correctible signal is discovered and corrected, a signal is derived from the decoding device which frees the storage means contents for subsequent transmission to converter ROC. The same operation would take place if there were no error to begin with. However, transmission to ROC is prevented if an uncorrectible error is discovered and this prevention is achieved by a gate blocking action and an error signal is delivered instead.

With duplex operation via two lines, the line L1 is connected to the receiver side of the distant station, which is constructed as described above, while the transmission side of the distant station is connected with the receiver side illustrated in the drawings via the second line L2. The uninterrupted and continuous stream of bits travels over both lines by means of a device as illustrated, and this stream of bits is interrupted only during the rest periods of the entire system.

As mentioned above, the symbols B*u* normally indicating "Buchstaben" which is "letters" or Z*i* normally indicating "Ziffern" which is "numbers" are used as filler symbols. Provision is made so that when uncorrectible errors are discovered in a receiver side, symbols indicating that such an error has occurred are produced. These symbols are inserted in place of the filler symbols B*u* or Z*i* which reoccur at certain intervals, as explained above, and involves the substitution, for example, of a symbol combination Z*i*G, which symbol combination does not occur anywhere else. This symbol combination is produced by the control network TC in the transmitter side of the receiving station. A line E1 from the control network RC to control network TC can be used for initiating this process. These error signals are thus transmitted within the continuous bit stream to the distant station by means of the return line and can at that point initiate suitable measures and particularly transmission repetitions.

Figure 2:
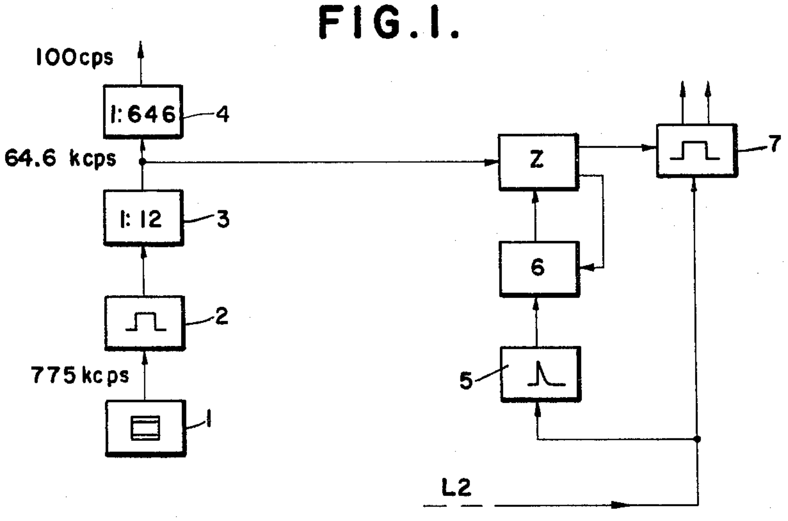
FIGURE 2 is a schematic block diagram indicating the synchronization means of the present invention.

The clocking device T as mentioned above delivers, in a duplex station, a bit cycle or frequency for transmission control network TC as well as for the reception control network RC. In a simplex system, such a clocking device T is provided for the control network TC of the transmitting station, and a similar clocking device is provided for the control network RC of the receiving station. Synchronization is effected in the following way: A frequency stable oscillator and particularly one which includes an oscillating quartz 1 (see FIGURE 2), generates in circuit 2 rectangular pulses having a frequency of, for example, 775 kilocycles. This is reduced to 64.6 kilocycles in a 1 to 12 reducer 3. A further converter 4 provides a 1 to 646 reduction to provide a synchronizing pulse frequency of 100 cycles which is delivered to the transmission control network TC. This control network TC causes the continuous succession of bits to be transmitted at this frequency.

For the receiver side, the frequency from reducer 3, which is 64.6 kilocycles, is fed to a counter Z which counts the pulses and normally has a maximum counting rate of 646. Upon reaching the maximum rate the counter emits an output pulse and resets to zero. The bits continuously arrive via line L2 and are fed to a flank detector 5 which determines, by differentiation, the arrival of a front flank and, in response, delivers a spike pulse which is fed to a comparator 6. If the time marker provided by this spike pulse appears before the counter reaches a count of 646, then the comparator device 6 switches the counter Z back to its start position at its next cycle right after the counter reaches a count of 645, and hence without waiting for the counter to attain a count of 646. By this means the synchronizing frequency is increased to 100.16 cycles and this frequency is maintained until the front flank appears at detector 5 later than a counter count of 645. Thereafter, return of the counter to its starting condition is again set to be at the counter condition of 646 and at this point the transmitter and receiver work synchronously at exactly 100 cycles.

If this spike pulse appears after the counter has reached a count of 646, the counter Z is reset to its start position at a time which is not before a count of 647 is reached and thus the synchronizing frequency is temporarily decreased to 99.84 cycles. This synchronization process takes the longest when the arrival of the front flank coincides with a counter count of 323 since in that case 323 counter cycle operations are necessary in order to achieve phase harmony. Since one counter cycle lasts for 10 milliseconds, the maximum duration until synchronization is achieved will take 3.23 seconds.

The bits arriving on the line are synchronized in synchronizing device 7 in correspondence with the output pulses of counter Z and the latter output pulses are also delivered to the receiver control network RC as clock pulses.

In the receiver control network there are means which provide for the transmission of a bell signal, which indicates the end of a telegram, to the final or processing device, but the further bell signals, which are received as filler signals, are kept from reaching this final processing device. The receiving final processing device receives data only when the series of bell signals is interrupted.

Figure 3:
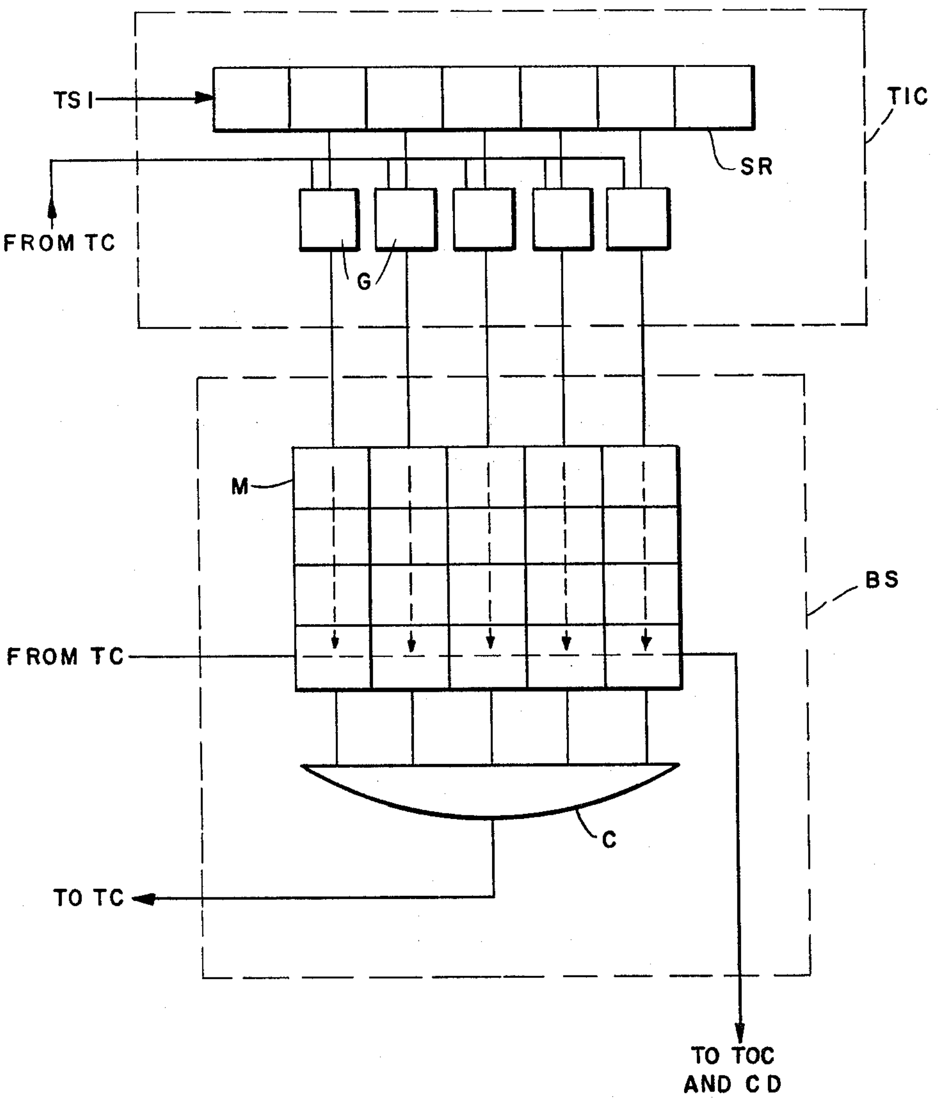
FIGURE 3 is a schematic block diagram indicating input converter means in connection with buffer storage means at the transmitter side of a system of the invention.

It is to be noted that all of the devices referred to in the preceding description can be built up with units which are known and conventional in the art of data processing. The input converter TIC, e.g., may mainly consist of a shift register, as indicated by SR in FIGURE 3, receiving, via the input TSI, bits "0" or L (the symbol L being employed here to distinguish from uses of the arabic numeral "1" for other purposes) according to Teletype steps in series, and having seven stages, so that it can be filled with seven bits constituting the seven steps of a teletype symbol. After the register has been filled, the outer right stage will contain the start step and the outer left stage the stop step. In FIGURE 3 the first stage and the last stage of unit SR are not connected to the buffer store BS. Instead they may be connected to the buffer store via gates so that the feeding of the start and stop steps to the buffer can be suppressed by closing the gates. Each time the register SR has been filled with the seven bits of a Teletype symbol, a transfer to the buffer store BS, via gates G, is effectuated by a transfer signal. The buffer store BS may be constructed principally as a matrix array M of bistable elements, the matrix having, e.g., five columns and four lines, the elements of each column being connected as a shift line as indicated by the vertical dashed arrows. The elements of the last line are, moreover, connected as a shift line as indicated by the horizontal dashed line so that the five bits stored in this last line can be shifted out serially into the channels leading them to the output converter TOC and to the coding device CD. Such shifting out is effected by a shifting command derived from a clock pulse from the control network TC whenever the last line contains any bits not equal to zero, and the criterion for the shifting out may be produced, e.g., by a coincidence gate C connected to the five elements of the last line of the buffer store and arranged to deliver an inhibiting signal to TC for preventing the shifting out when all of these elements are set at "0," but to allow the shifting out when any element contains an L. The column shifts in the matrix M of the buffer store are guided in a known manner in such a way when a line of the matrix is empty (that is contains only values of "0") then the contents of the preceding line, if it contains any value L, is transferred to the empty line by column shifting.

The control networks TC and RC are control units which control the other digital equipment according to a fixed program taking into consideration certain other conditions as described above. Such control units, and their manner of construction, is generally known in the art of electronic computers (see, e.g., the "Handbook of Automation, Computation, and Control" by Grabbe, Ramo, Wooldridge, vol. 2, 1959, 5–40–5–42). In the present case the control networks are for the most part to be organized to control transfer steps and to control the operations of the coding and decoding devices (as kinds of arithmetic units, the function of which is disclosed in the above-mentioned article by Peterson), as described previously. As far as concerns the operation of the control network TC to deliver bit sequences according to bell signals and symbols B*u*, *Zi*, *Zi*G, it is clear that some means for permanently storing such bit sequences is to be incorporated in the control network, e.g., in the form of registers the digits of which are interconnected to circulate their contents in a cyclic shift mode, and, at the same time, to feed their contents out in series.

Figure 4:
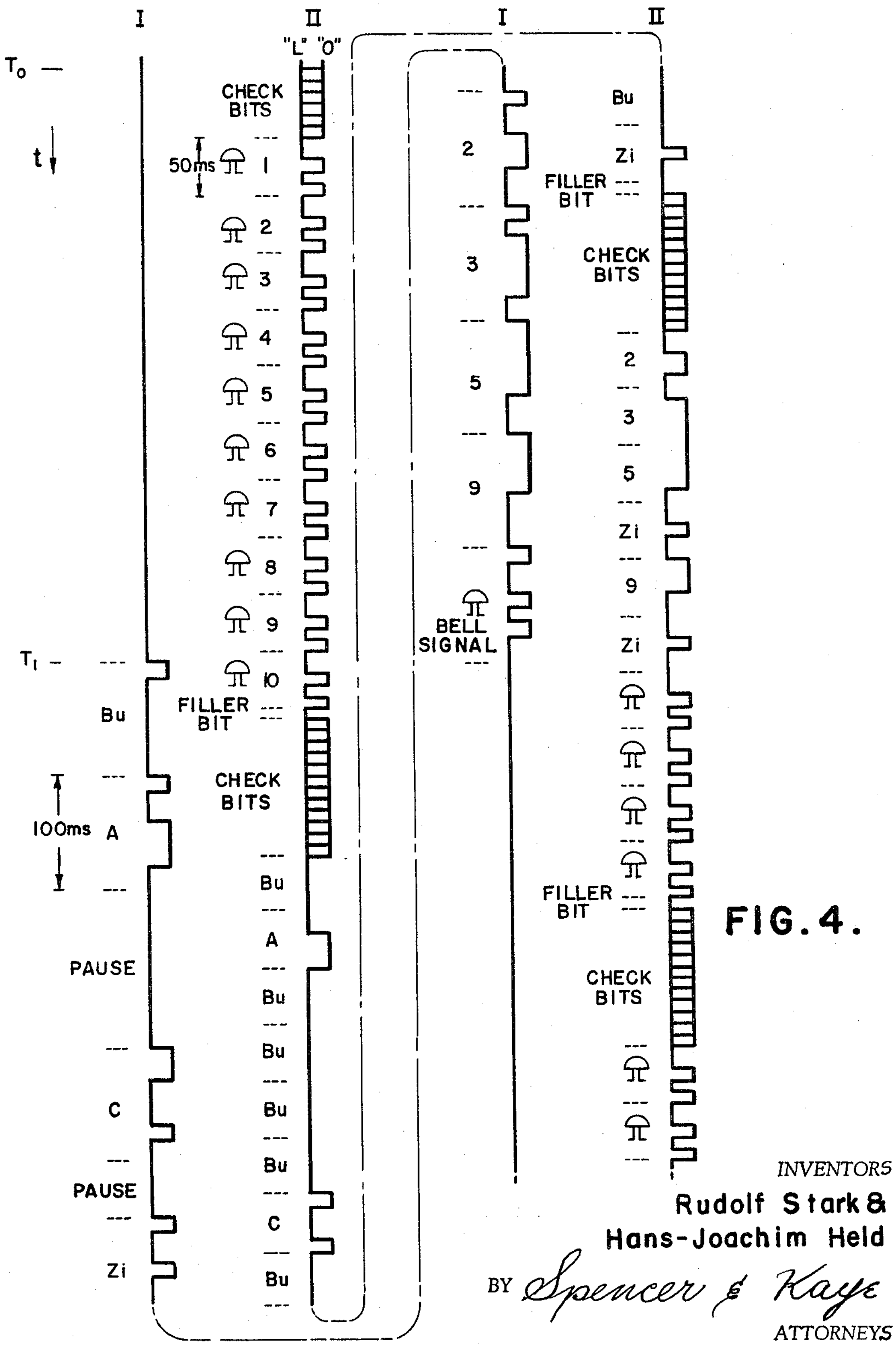
FIGURE 4 shows pulse diagrams of Teletype messages and of a continuous stream of successive bits as generated by the system of the present invention and containing these messages.

Each of the buffer storage units RBS1 and RBS2 is constructed as a buffer storage of the type shown in FIG. 4 of the Peterson article cited above. The rest of the circuits associated therewith in said FIG. 4 are represented by each of the blocks DD1 and DD2 in FIG. 1 of the present drawings.

When the preferred method of recycling the contents of the buffer storage units RBS1, RBS2 before delivering the results—or not—to the output converter ROC as described above is used, then, of course, the connections from DD1 and DD2 to ROC are omitted and connections R1′ and R2′ are established in their stead from the outputs of DD1 and DD2 to the recycling paths R1 and R2, respectively, and a gate, as mentioned previously, is inserted into the path connecting RBS1 and RBS2, respectively, to ROC.

The output converter ROC receives the bits of the message either in parallel or serial mode and contains accommodating circuits adapted to the requirements of the output channel RSO, which may vary depending on the kind of apparatus to which the messages are to be delivered. If this apparatus is a Teletype receiver, then the control network RC can cause start and stop steps to be added again, e.g., by effecting a serial transmission of the bits, in groups of five bits each to ROC, each group representing a symbol, and by delivering a start step bit before the transmission of each group and a stop step bit after the transmission of the group.

The converters TOC and RIC contain accommodating circuits the nature of which depend on the requirements of the transmission lines L1, L2, which may be of different types.

The diagrams of FIG. 4 will aid in understanding exactly the function mode of the transmitting side of apparatus according to the invention. Line I shows the pulse diagram of a Teletype message, Line II shows the pulse diagram of the continuous bit stream containing this message and to be fed into the output converter TOC. From the beginning of line I (left), that is time T0, up to the time T1, no message is sent into TSI of FIG. 1. During this time, bell signals are delivered by TC. The beginning of line II shows the ends of a sequence of 12 check bits derived from 10 previous bell signals. After this sequence the bit sequences of 10 bell signals numbered 1–10, each having 5 bits and a duration of 50 ms., are delivered, followed by a filler bit. Next follows the series of 12 check bits derived from the bell signals 1–10. In the meantime, beginning at T1, an operator has sent the Teletype sign B*u* followed by the letter A. The corresponding bits are stored in unit BS of FIGURE 1, this storage being necessary because when B*u* is first delivered, the coding device is still occupied with delivering the check bits just mentioned. When this sequence of check bits is terminated, the bit sequence of B*u* is shifted out of the last line of matrix M and appears in II as indicated. At the end of this sequence, the letter A (see line I) is also available, and its bit sequence appears after the end of B*u* in line II. It is assumed now that the operator makes a pause after sending letter A and before sending the following letter C as shown in line I. Therefore, when the bit sequence of letter A is terminated in II, no message symbol is available from buffer storage BS. Accordingly, the control device TC begins to deliver the bit sequences of filler symbols B*u*, as indicated in II. While it delivers the fourth filler symbol B*u*, the letter C becomes available, and therefore the bit sequence representing C appears after the fourth filler symbol B*u*. After letter C and a short pause, the Teletype sign *Zi* (see line I) is sent. But when the bit sequence of C is terminated in line II, the sign *Zi* is not yet available. Therefore TC emits two further filler symbols B*u*. Thereafter, the bit sequence of *Zi* appears in II (right). With this bit sequence of *Zi* in II the bit sequences of 10 symbols, namely B*u*, A, B*u*, B*u*, B*u*, B*u*, C, B*u*, B*u*, *Zi*, have occurred, with the consequence that now a filler bit appears, followed by the sequence of 12 check bits pertaining to the 10 symbols as mentioned before.

Now it may be assumed that the sign *Zi*, as mentioned before, a following number 2 and further numbers 3, 5, 9 (see line I, right) are fed into TSI one immediately after another, e.g. automatically by a computer control device which delivers the Teletype symbols each having seven steps and a duration of 100 ms. as before. This sequence of symbols may be terminated by a bell signal which indicates the end of the transmission. When symbol 2 is available, TOC (FIG. 1) is occupied with delivering check bits, but at the end of the 12 check bits the bit sequence of "2" can join to the end of the check bits, followed by the bit sequence of "3," as this symbol has also become available in the meantime. During this sequence the symbol "5" also becomes available, and the corresponding bit sequence joins to the end of the bit sequence "3," as can be seen in line II (right) of the diagram. When the bit sequence "5" is terminated, the symbol 9 (line I) is not yet available with the consequence that the bits of a filler sign $Zi$ are now inserted (line II) by the control network TC. Thereafter, the symbol 9 is available and the corresponding bit sequence is delivered by BS. At the end of this bit sequence the bell signal (line I) is not yet available, and therefore the bit sequence of another filler symbol $Zi$ is produced, as can be seen in line II. After this sequence, the bell signal is available and the corresponding bit sequence appears in II. Thereafter, no further Teletype symbols injected via input TSI (FIG. 1) are available, and therefore the control network begins to deliver the bit sequences of further bell signals, as shown in line II. With the fourth bell signal sequence, 10 symbol bit sequences have been delivered. Therefore, there next appears a filler bit and thereafter the sequence of 12 check bits. Then the control network TC resumes delivery of bit sequences of bell signals, as can be seen at the end of line II (right) of the diagram.

It will be understood that the above description of the present invention is susceptible to various modifications, changes, and adaptations, and the same are intended to be comprehended within the meaning and range of equivalents of the appended claims.

What is claimed is:

1. In a system for the transmission of digital data via a transmission path requiring protective measures against errors and wherein the data is coded in bits and subjected to a longitudinal test and which operates by adding check bits to a succession of bits of predetermined length, the improvement comprising:

clock means for producing a continuous stream of bits for the transmission path to provide for synchronization;

input means receiving input data and controlled to have a certain speed;

transmission speed controlling and buffer storage means connected to receive data in the form of bits from said input means and for feeding it to the transmission path in the form of bits at a higher speed than that of the input means;

transmission control means connected to said clock means, said input means, and said transmission speed controlling means for causing data bits and check bits, when they occur, to be put in the place of certain of the bits of the continuous stream to form blocks of bits of predetermined length and for inserting filler bits in the block both when the number of data bits is smaller than the predetermined number for the block and when no data bits at all occur;

coding means connected to said control means for inserting into the stream of bits from said transmission speed controlling means, after a predetermined number of data bits and any filler bits which may be required for the block have been transmitted, a number of check bits needed for error protection; and a receiver connected for the reception from the transmission path of blocks of bits and including: two buffer storage means for receiving information in the form of bits at one speed and feeding it out at a decreased speed; two decoding means each connected to cooperate with a respective buffer storage means; and output converter means connected to receive data from the buffer storage means alternately so that one buffer storage means receives the bits while the other transmits its information.

2. The improvement as defined in claim 1 comprising a receiver control means connected to control the alternate operation of said two receiver buffer storage means.

3. In a system for the transmission of digital data via a transmission path requiring protective measures against errors and wherein the data is coded in bits and subjected to a longitudinal test and which operates by adding check bits to a succession of bits of predetermined length to form a block, the improvement comprising:

(A) a transmission assembly including (1) clock means for producing a continuous stream of bits for the transmission path to provide for synchronization, (2) input means for receiving input data at a certain speed, (3) buffer storage means connected to receive data in the form of bits from said input means and for feeding it to the transmission path in the form of bits at a higher speed than that of the input means, (4) transmission control means connected to said clock means, said input means, and said buffer storage means for causing data bits and check bits, when they occur, to be put in the place of certain of the bits of the continuous stream to form blocks of bits of predetermined length and for inserting filler bits in the block both when the number of data bits is smaller than the predetermined number for the block and when no data bits at all occur, and (5) coding means connected to said control means for inserting into the stream of bits from said buffer storage means, after a predetermined number of data bits and any filler bits which may be required for the block have been transmitted, a number of check bits needed for error protection; and (B) a receiver assembly connected at the other end of the transmission path for receiving bits transmitted by said transmitting assembly and including (1) two buffer storage means for receiving information in the form of blocks of bits at one speed and feeding it out at a decreased speed, (2) two decoding means each connected to operate with a respective buffer storage means to control the output of the buffer storage means so that before it delivers data therefrom the data appearing at the output thereof is fed back to the input of the storage means and an error examination takes place so that the data is delivered past the output only when it is determined that there are no errors present, and when a correctible error has been determined and corrected, but when an uncorrectible error is detected an error signal is delivered instead, (3) output converter means connected to receive data from the two buffer storage means alternately so that one buffer storage means receives the bits while the other transmits its information, and (4) receiver control means connected to control the alternate operation of said two receiver buffer storage means.

4. The improvement as defined in claim 3 wherein the receiver control means is connected to said clock means so that the receiver assembly and transmitter assembly are arranged for synchronous operation.

5. The improvement as defined in claim 4 wherein said clock means includes a frequency stable oscillator, means for converting the signal from said oscillator to provide the bit synchronization frequency and connected to feed this frequency to the transmission control means, a counter having a counter rate whose maximum counting rate is arranged to be controlled by the frequency stable oscillator in dependence upon the chronological arrival of the bits.

6. In a system for the transmission of digital data via a transmission path reqiring protective measures against errors and wherein the data is coded in bits and subjected to a longitudinal test and which operates by adding check bits to a succession of bits of predetermined length, the improvement comprising:

clock means for producing a continuous stream of bits for the transmission path to provide for synchronization;

input converter means receiving input data and controlled to have a certain speed and which eliminates start and stop steps;

buffer storage means connected to receive data in the form of bits from said input converter means and for delivering it in the form of bits at a higher speed than that of the input converter means;

an output converter connected to receive the output from said buffer storage means and feeding it to the transmission path; transmission control means connected to said clock means, said input means, and said transmission speed controlling means for causing data bits and check bits, when they occur, to be put in the place of the bits of the continuous stream which are made the bits of the filler signals; and coding means connected to said control means for inserting into the stream of bits from said transmission speed controlling means, after a predetermined number of data bits and any filler bits which may be required have been transmitted, a number of check bits needed for error protection.

7. In a system for the transmission of digital data via a transmission path requiring protective measures against errors and wherein the data is coded in bits and subjected to a longitudinal test and which operates by adding check bits to a succession of bits of predetermined length, which system includes: clock means for controlling the production of continuous stream of bits to provide for synchronization of an associated receiver; transmission control means connected to the clock means for emitting filler signals in synchronism with the output from the clock means; input means for receiving input data; coding means for generating a plurality of check bits; buffer storage means connected to receive data in the form of bits from said input means and for delivering it in the form of bits at a bit speed which is higher than the maximum speed at which data is received by said input means; and output converter means connected to the buffer storage means for delivering blocks of bits succeeded by check bits for the transmission path, the improvement wherein:

(a) said output converter means are connected, via one transmission path each, to said buffer storage means for receiving individually releasable groups of data bits, to said coding means for receiving check bits, and to said transmission control means for receiving filler signals;

(b) said transmission control means are also connected to said coding means and to said buffer storage means for delivering data bits from said buffer storage means to said output converter means whenever such bits are available and delivering filler signals to said output converter whenever such data bits are unavailable, and for releasing check bits from said coding means to said output converter means after a predetermined number, corresponding to a block, of data bits and any required filler signals have been made available, whereby an uninterrupted stream of bits is delivered to said output converter means at the rate required for maintaining synchronization of the associated receiver; and (c) the data bits and filler signals are also delivered to said coding means for grouping into coded blocks, each block being succeeded in the transmission path by its associated check bits.

8. An arrangement as defined in claim 7 wherein the rate at which bits are delivered to the transmission path is sufficiently greater than the maximum rate at which input data is delivered to said input means to assure that intervals for the insertion of filler signals will appear periodically at said output converter and will appear with sufficient frequency to permit the filler signals to be used for providing error indications.

References Cited

UNITED STATES PATENTS

| | | | |
|---|---|---|---|
| 2,805,278 | 9/1957 | Van Duuren | 178—2 |
| 3,159,810 | 12/1964 | Fire | 340—146.1 |

FOREIGN PATENTS

| | | |
|---|---|---|
| 946,492 | 1/1964 | Great Britain. |

MALCOLM A. MORRISON, *Primary Examiner.*

C. E. ATKINSON, *Assistant Examiner.*